H. W. SMITH.
Grain Drill.
No. 4,833.
Patented Nov. 4, 1846.
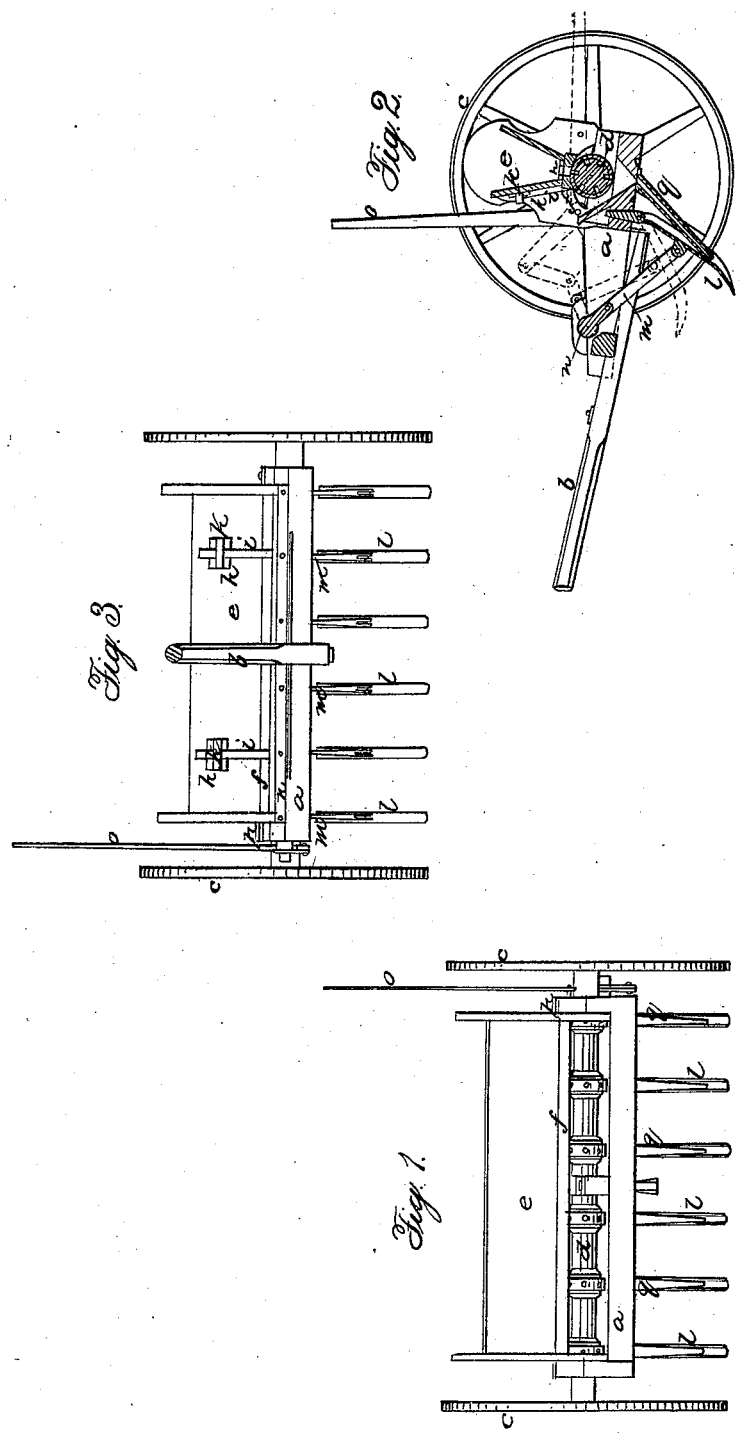

UNITED STATES PATENT OFFICE.

HENRY W. SMITH, OF PARADISE, PENNSYLVANIA.

IMPROVEMENT IN SEED-PLANTERS.

Specification forming part of Letters Patent No. 4,833, dated November 4, 1846.

*To all whom it may concern:*

Be it known that I, HENRY W. SMITH, of Paradise, in the county of Lancaster and State of Pennsylvania, have invented a new and improved Wheat-Drill; and I hereby declare that the following is a full, clear, and exact description of the principle or character which distinguishes it from all other things before known, and of the manner of making, constructing, and using the same, reference being had to the accompanying drawings, making part of this specification, in which—

Figure 1 is a rear elevation of the machine; Fig. 2, a vertical longitudinal section. Fig. 3 is a front view of the machine.

The same letters indicate like parts in all the figures.

The nature of my invention consists in so constructing the drill as to raise the teeth when not in use for the purpose of conveying it from place to place, and in forming the seed distributing-cylinder in two parts, so that the wheels can be attached directly to the said cylinder, while at the same time they have a motion independent of each other, the quantity of the seed to be distributed being regulated by means of a sliding concave attached to the front of the said hopper.

The construction is as follows:

A suitable oblong frame, $a$, is made, from which a pole, $b$, projects in front to hitch the horses to. This frame is supported on two wheels, $c$, the axles of which are firmly attached to them and are enlarged inside their bearings to form a distributing cylinder, $d$. They extend in only to the center on each side, and the two turn independent on each other. The hopper $e$ is placed directly over these cylinders, in the bottom of which there is a series of holes to let the grain through, and around the cylinder, opposite each of these holes, are other holes that receive and convey the seed into the tubes that guide them into the drills.

In front of the hopper a concave, $f$, is placed, that is caused to rise or fall by means of wedges $h$, that pass through standards $i$, connected with the concave at the point where said standards pass through the loop $k$, that connects it with the front of the hopper. By moving these wedges back and forth the concave is moved up and down, and by it the quantity of grain sown per acre determined, and the wedges can be properly marked to accurately determine the quantity sown.

In front of the hopper and cylinder a row of jointed teeth, $l$, are attached to the frame. They are connected by a chain or link, $m$, to arms projecting from a roller, $n$, in the front part of the frame. When the arms are turned up, as shown by the dotted lines in Fig. 2, they draw up the teeth so that they will not act; but when they are let down the teeth again come into action, as represented in the figure. This movement is performed by a lever, $o$, connected with said roller, as clearly shown in Fig. 2.

The bottom of the hopper is furnished with a common slide-valve, $p$, to shut off the seed from the cylinder, and the tubes $q$, that convey the grain from the cylinder to the drills, are the common flexible ones.

By the above machine the seed is more evenly distributed in turning curves, as in that case one cylinder turns faster than the other and the machine is less liable to be deranged.

Having thus fully described my improvements, what I claim as my invention, and desire to secure by Letters Patent, is—

1. The employment of a cylinder for seeding, divided into two parts and directly attached to the wheels in the manner and for the purpose set forth.

2. Elevating the teeth in the manner and for the purpose specified.

3. Gaging the quantity of grain by means of the adjustable concave and wedges, as described.

H. W. SMITH.

Witnesses:
   J. J. GREENOUGH,
   A. P. BROWNE.